UNITED STATES PATENT OFFICE.

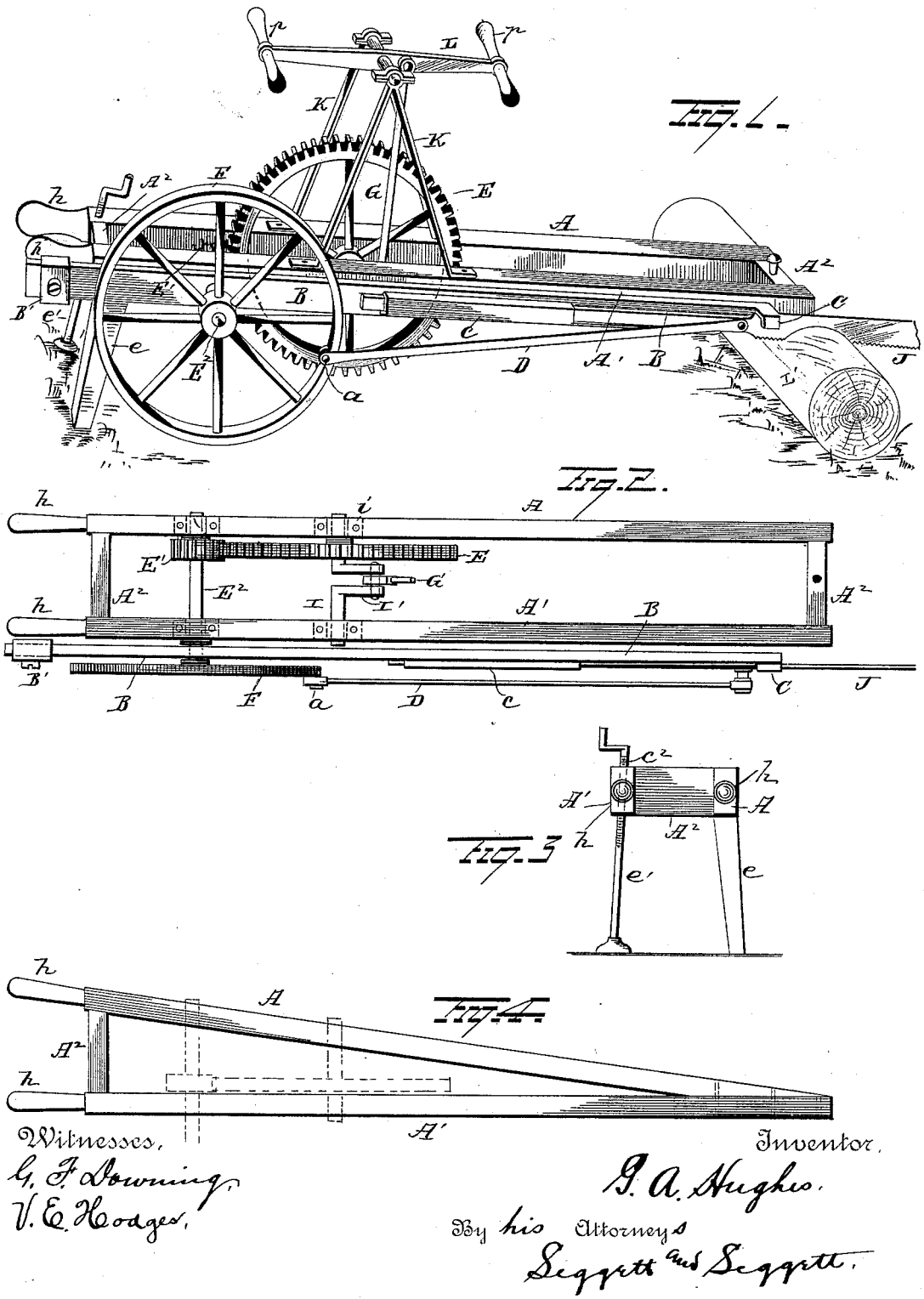

GARRETTSON A. HUGHES, OF ASHLAND, OHIO.

DRAG-SAWING MACHINE.

SPECIFICATION forming part of Letters Patent No. 392,561, dated November 6, 1888.

Application filed March 23, 1888. Serial No. 268,240. (No model.)

*To all whom it may concern:*

Be it known that I, GARRETTSON A. HUGHES, of Ashland, in the county of Ashland and State of Ohio, have invented certain new and useful Improvements in Drag-Sawing Machines; and I do hereby declare the following to be a full, clear, and exact description of the invention, such as will enable others skilled in the art to which it appertains to make and use the same.
My invention relates to an improvement in drag-sawing machines, which are adapted to crosscut logs or other timber.

The object of this invention is to provide a portable drag-sawing machine which will be of simple and substantial construction and that can be readily operated by one or two men, so as to rapidly and easily cut logs or timber of any diameter into desired lengths.

With this object in view my invention consists in the construction and combinations of parts of the device, as will be hereinafter described, and pointed out in the claims.

Referring to the drawings, Figure 1 is a side elevation in perspective of the device in position for use. Fig. 2 is a plan view of the mechanism that drives the saw. Fig. 3 is a side view of a portion of the device removed from the machine to more clearly represent it. Fig. 4 is a plan view of the device, showing a preferred form of the frame which supports the sawing mechanism.

A A' are two parallel timbers held together at one end by the cross-piece A². This constitutes the shears or frame of the machine.
There are handles *h h* made to project from the pieces A A' beyond the cross-piece to afford means for transporting the same, and at the end of the frame two legs, *e e'*, are made to project downwardly of a proper length to support the device above the ground and allow the mechanism to operate freely.

A preferred form of the frame or shears is shown in Fig. 4. This consists in the connection of the two pieces A A' at their forward ends, one piece projecting beyond the other to rest on a log or piece of timber which is to be cut by the saw. These two frame-pieces A A' diverge from each other at a proper angle to receive the cross-piece A² between them, and thus produce a triangular frame that is more compact than a rectangular shear-frame. One of the legs *e'*, which serve to support the rear end of the shears, can be adjusted to suit the ground it rests on, and the saw be caused to cut a log off squarely, be the ground it rests upon level or uneven. This is one of the essential features of the device.

The driving-gear of the drag-saw consists of a shaft, I, which is mounted in boxes *i i*, inserted in the frame-pieces A A', so as to engage the ends of the shaft, which latter is provided with a double crank, I', the connecting journal or pin that is affixed to the outer ends of the twin cranks affording a means for communicating a reciprocatory movement to the connecting-rod D, which moves the saw J, as will be further explained.

Upon the crank-shaft I a spur-gear wheel, E, is mounted and secured so as to lie between the frame-pieces A A', and toward the rear end of the frame a counter-shaft, E², is supported in boxes that are inserted or affixed to the frame-pieces A A' at such a distance from the parallel crank-shaft I that the small toothed pinion E' on shaft E² will have engagement with the spur-wheel E to be rotated by it with accelerated motion proportionate in its increase of speed to the relative diameter of the spur-wheel and pinion. The counter-shaft E² has its end extended through the frame-piece A', and on it the balanced beam B is secured at a point close to the outside of the frame-piece A', but not in contact with it.

Upon the outer surface of the beam B, near its forward end, the cap-plate C is bolted or screwed fast to the top and bottom guides *c c*, which are formed integral or fastened to the beam B. On the outer end of the shaft E², outside of the beam B, a balance-wheel, F, is secured, and upon one arm of this wheel a crank-pin, *a*, is made to project, on which the rear end of the connecting-rod D is loosely secured. The front end of the connecting-rod D is pivotally attached to the rear end of the blade of the crosscut-saw J, which is supported by proper means in a sliding connection with the guides *c c*, so that the saw will be reciprocated by the rotation of the wheel F in an obvious manner.

On the frame-pieces A A' a supporting bracket-frame, K, is mounted and fixed immediately over the crank-shaft I. Upon this frame K the vibrating lever L is pivoted near its center of length to allow the cross-handles p p, which are affixed at the ends of the lever, to be grasped by one or two men, who by an oscillation of the lever a proper distance communicate rotary motion to the double crank I' and the attached gearing by means of the pitman G, which is pivoted at its upper end to the lever L near the point of vibratory support of the latter, this pitman being also loosely secured to the connecting-pin of the double crank I'.

The beam B is preferably weighted at B' to nearly counterbalance the outer end or portion to which the saw J is attached, so that these parts may be readily vibrated vertically by an oscillation of the beam on the supporting-shaft $E^2$.

From the foregoing description it will be evident that this sawing-machine will give a rapid reciprocal movement to the crosscut-saw J, and from the simple but efficient gearing employed and means of actuating the same the saw-log L' or other timber that the sawing-machine is applied to may be rapidly divided into sections of any desired length.

In operation it will be understood that the body of the saw J will by gravity of the parts, which is sufficient to insure a proper cutting action of its teeth, be fed down through the log, the frame of the machine resting upon the log with its free end, as shown in Fig. 1. When one section of a log has been cut off, as stated, the whole device may be moved along the body of the log or timber to a desired point and be properly secured and adjusted to cut another section off. This machine is particularly available in squaring the ends of saw-logs where they are cut down in the woods, and it may also be used in framing timber or sawing logs up into lengths for fire-wood. In fact, it is available for all purposes where a hand crosscut-saw is employed to cut logs or timber, to reduce long pieces to a shorter length, or divide them into a series of pieces.

Many slight changes might be made in the construction of this device without exceeding the scope of my invention. Hence I do not wish to be restricted to the exact forms shown; but, Having fully described my invention, what I claim as new, and desire to secure by Letters Patent, is—

1. The combination, with an elongated frame having legs at one end, the opposite end of said frame adapted to rest on the tree or log, of a crank-wheel journaled in said elongated frame, a balanced beam mounted on the crank-wheel shaft, a saw having a sliding movement on said beam, a pitman connecting the saw and crank-wheel, and gearing for rotating the crank-wheel, substantially as set forth.

2. The combination, with an elongated frame having a rigid leg and an adjustable leg at one end, the opposite end of said frame being constructed to rest on the log, of a crank-wheel, a beam pivotally secured on the crank-wheel shaft, a weight attached to the beam on one side of said shaft, a saw mounted in bearings on the beam on the opposite side of the shaft, a pitman connecting the saw and crank-wheel, and gearing for operating the crank-wheel, substantially as set forth.

In testimony whereof I have signed this specification in the presence of two subscribing witnesses.

GARRETTSON A. HUGHES.

Witnesses:
J. D. JONES,
H. HEIFNER.